(12) United States Patent
Thomas (10) Patent No.: US 8,695,378 B2
(45) Date of Patent: Apr. 15, 2014

(54) APPARATUS FOR MAKING GLASS AND METHODS

(75) Inventor: Robert Richard Thomas, Watkins Glen, NY (US)

(73) Assignee: Corning Incorporated, Corning, NY (US)

( * ) Notice: Subject to any disclaimer, the term of this patent is extended or adjusted under 35 U.S.C. 154(b) by 808 days.

(21) Appl. No.: 12/324,303

(22) Filed: Nov. 26, 2008

(65) Prior Publication Data

US 2010/0126223 A1 May 27, 2010

(51) Int. Cl.
*C03B 5/235* (2006.01)

(52) U.S. Cl.
USPC ........................................ 65/134.1

(58) Field of Classification Search
USPC ................................. 65/129, 134.1
See application file for complete search history.

(56) References Cited

U.S. PATENT DOCUMENTS

| | | | |
|---|---|---|---|
| 4,365,987 A * | 12/1982 | Boettner | 65/137 |
| 4,426,217 A * | 1/1984 | Farrar et al. | 65/135.8 |
| 5,925,161 A * | 7/1999 | Dembicki et al. | 65/145 |
| 2003/0037572 A1* | 2/2003 | Dick et al. | 65/134.9 |
| 2006/0242996 A1 | 11/2006 | DeAngelis | 65/134.1 |
| 2007/0151297 A1 | 7/2007 | DeAngelis | 65/29.21 |
| 2007/0175241 A1* | 8/2007 | DeLamielleure et al. | 65/134.4 |

* cited by examiner

*Primary Examiner* — Joseph S Del Sole
*Assistant Examiner* — Erin Snelting
(74) *Attorney, Agent, or Firm* — Matthew J. Mason; Steven S. Wentsler (57) ABSTRACT

Methods of making glass include the steps of providing a glass melt in a first melting furnace and flowing the glass melt through a connecting tube from the first melting furnace to a second melting furnace. The methods further include the steps of heating the glass melt within a first area of the connecting tube with a first heating device and heating the glass melt within a second area of the connecting tube with a second heating device. Apparatus for making glass are also provided with a first melting furnace, a second melting furnace, and a connecting tube connecting the first and second melting furnaces. Example apparatus include a first heating device configured to heat the glass melt within the first area of the connecting tube and a second heating device configured to heat the glass melt within the second area of the connecting tube.

15 Claims, 3 Drawing Sheets

APPARATUS FOR MAKING GLASS AND METHODS

FIELD

This invention is directed to apparatus for making glass and methods, and in particular apparatus and methods utilizing a multi-zone glass melter.

BACKGROUND

Liquid crystal displays (LCDs) are passive flat panel displays which depend upon external sources of light for illumination. Alkali-free alumino-silicate glasses are commonly used for LCD sheet glass applications. This family of glasses tends to create a stable foam layer on the surface of the melting furnace (melter) in a location where the batch (glass feed) materials are filled. The foam layer contains solid silica inclusions that can become either solid "stone" or clear "knot" defects in the finished glass unless they are removed prior to the glass entering the delivery system. It has been shown that this foam layer, when allowed to reach the front wall of the melter, can deliver solid and gaseous inclusions via the melter exit to the glass delivery system. These solid inclusions can become solid defects in the finished glass. The foam layer also insulates the glass melt from heat supplied by combustion burners above the free surface of the glass melt. The subsequent poor efficiency of the burners means that most of the energy required to form the melt is provided by Joule heating from electrodes submerged below the free surface of the melt. The resulting relatively high levels of electric power shortens electrode life and leads to frequent melter repairs.

A single melter with two or more zones can prevent the silica inclusions resident in the foam layer from entering the glass delivery system. A wall separating the first and second zones can prevent the foam layer in the first zone from entering the second zone. Historically, division of a melter into multiple zones has been done with either an internally-cooled cross wall with one or more slot-shaped throats (dividing one large glass bath into two smaller zones) or with two separate chambers connected with a tunnel-shaped throat.

In the case of the cross wall, both sides of the cross wall are hot and generally corrosion of the wall by the glass is relatively fast. Thus, process life is short. Melting effectiveness ends when the top of the cross wall is breached or when internal cooling fails, releasing cooling water directly (and explosively) into the glass melt. Furthermore, if the cross wall is constructed of fused zirconia refractory, the electrical resistivity of the cross wall will be low, and both faces will be hot. Some of the electric current used to heat the glass bath may pass through the cross wall, heating it independently and potentially causing failure of the wall or formation of zirconia inclusions in the melt. Generally, cross walls are effective for limited periods of time but represent a life-limiting part of a glass melting process.

The conventional approach to these problems is to enlarge the melter. It is estimated that to achieve a foam-free surface would require at least a doubling of the present-day melt surface area. Further, to reduce solid and gaseous inclusions to the desired level would require another multiple, bringing the total enlarged melter size to three times the present day surface area. Such large increases in the dimensions of the melting furnace lead to increased capital and operating expenses, and, because the number of electrodes (typically tin oxide) would necessarily increase, may also result in raising the amount of tin oxide in the glass to levels where Cassiterite devitrification of the melt can occur.

Melters can also be separated into zones that do not share a common wall. In this case, the first and second zones may have their own walls that are connected by a tunnel-shaped throat. This allows the walls to have exterior cooling but creates a significant unheated area within the melter where the glass can lose temperature as it passes from the first zone to the second zone. The effectiveness of the second zone in melting out solid inclusions or fining out gaseous inclusions diminishes when the glass enters the second zone colder than it exited the first zone. In addition, refractory throat covers will wear away to the glass level, ultimately allowing the foam layer to pass through from the first to the second zone. A throat leak can cause shutdown of the process altogether.

For a two-zone melter to be effective in keeping the solid and gaseous inclusions entrained within the foam layer from entering the delivery system, the separation between the first and second zones must retain its integrity. Otherwise, the melter becomes one large container that allows the foam layer to move forward to the front-wall and deliver solid inclusions from the foam layer into the glass delivery system.

When a melting process comprised of two or more zones is effective, the foam layer is prevented from forming in the second zone and additional time and temperature is available in the second zone to melt out the solid inclusions or fine out gaseous inclusions that enter it.

SUMMARY

In one example aspect, a method of making glass is provided. The method includes the steps of providing a glass melt in a first melting furnace and flowing the glass melt through a connecting tube from the first melting furnace to a second melting furnace. The glass melt flows through a first area of the connecting tube located upstream from the second melting furnace and a second area of the connecting tube located downstream from the first area. The method further includes the steps of heating the glass melt within the first area with a first heating device and heating the glass melt within the second area with a second heating device.

In another example aspect, an apparatus for making glass is provided. The apparatus includes a first melting furnace, a second melting furnace, and a connecting tube connecting the first and second melting furnaces for transporting a glass melt from the first melting furnace to the second melting furnace. The connecting tube includes a first portion defining a first area and a second portion defining a second area. The first area is located upstream from the second melting furnace and the second area is located downstream from the first area. The apparatus further includes a first heating device configured to heat the glass melt within the first area of the connecting tube and a second heating device configured to heat the glass melt within the second area of the connecting tube.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Various multi-zone melting apparatus can include one or more aspects of the present invention. For instance, aspects of the present invention may be used in accordance with the multi-zone melting apparatus disclosed in U.S. Patent Application Publication No. 2007/0151297, filed Dec. 29, 2005 which is herein incorporated by reference in its entirety.

Figure 1:
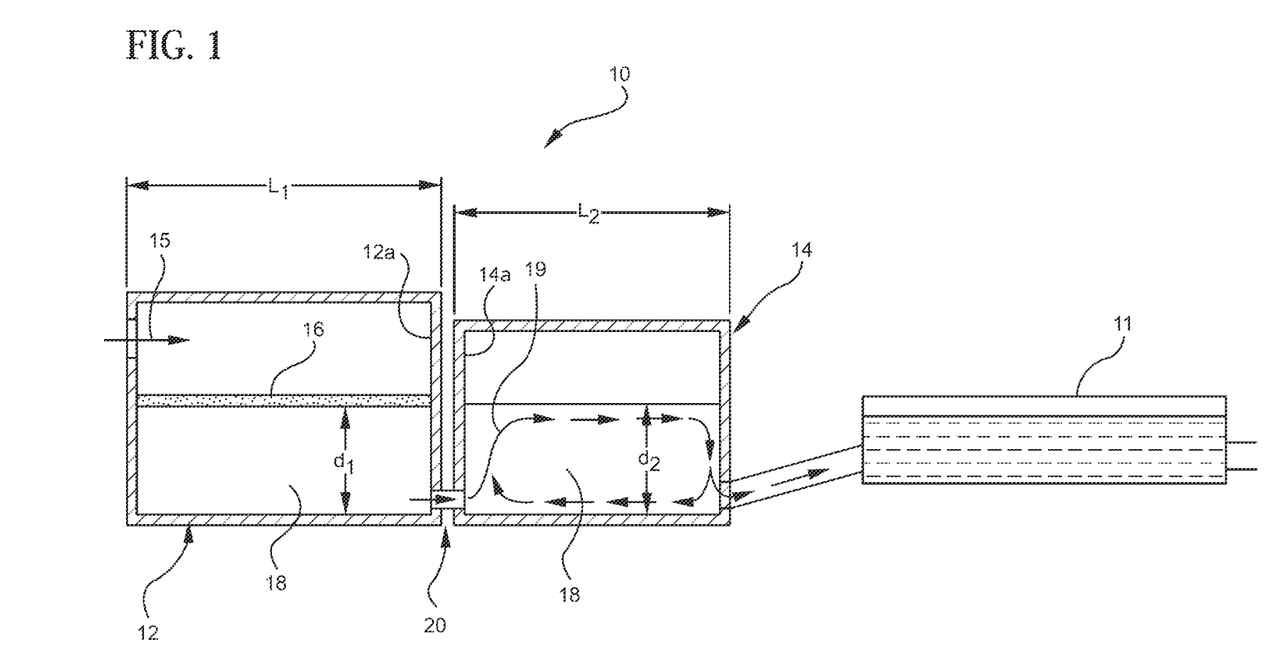
FIG. 1 is a schematic cross sectional side view of an apparatus according to an example embodiment of the present invention.

As shown in FIG. 1, an example apparatus 10 for making glass can include two or more melting furnaces such as a first melting furnace 12 and a second melting furnace 14 that are separate from one another. For instance, the first melting furnace 12 and the second melting furnace 14 may be configured without sharing a common wall between the two volumes of glass melt contained in the respective furnaces. In one example, the first melting furnace 12 may include a front wall 12a and the second melting furnace 14 may include a back wall 14a. The front wall 12a can be considered the wall where the glass melt exits when traveling to the second melting furnace 14. The back wall 14a can be considered the wall where the glass melt enters after exiting the front wall 12a. As shown, the front wall 12a can be spaced from the back wall 14a and can also face the back wall 14a although the walls may face away from one another in further examples. The front wall 12a is also shown to be substantially parallel with respect to the back wall 14a although the front wall can be angled or otherwise oriented with respect to the back wall in further examples. The first melting furnace and the second melting furnace can be constructed from a wide variety of materials capable of withstanding the glass melt process conditions. For instance, the furnaces can be constructed from non-metallic refractory blocks comprised of burned flint clay, sillimanite, zircon or other refractory material.

In example embodiments, the second melting furnace 14 can provide a lower melting rate than first melting furnace 12. For instance, the melting rate in the first melting furnace 12 can be selected to be equal to or greater than the minimum melt rate necessary to put the feed materials into solution. The second melting furnace 14 can be provided with a melting rate which between about 50% and 90% of the melting rate of first melting furnace 12. As used herein, melting rate can be expressed in units of surface area divided by the flow rate of glass from the furnace, e.g. meters squared divided by tons per day (m²/tons/day). Thus, for a given flow rate, the required furnace dimensions may be easily calculated. In one example, length $L_2$ of second melting furnace 14 can be between about 30% and 50% of the length $L_1$ of first melting furnace 12. The operating depth $d_2$ of the glass melt within second melting furnace 14 can be chosen to maximize both the temperature of the melt and the residence time of the melt within the furnace, and can be between about 65% and 110% of the depth $d_1$, of the glass melt within first melting furnace 12.

Figure 2:
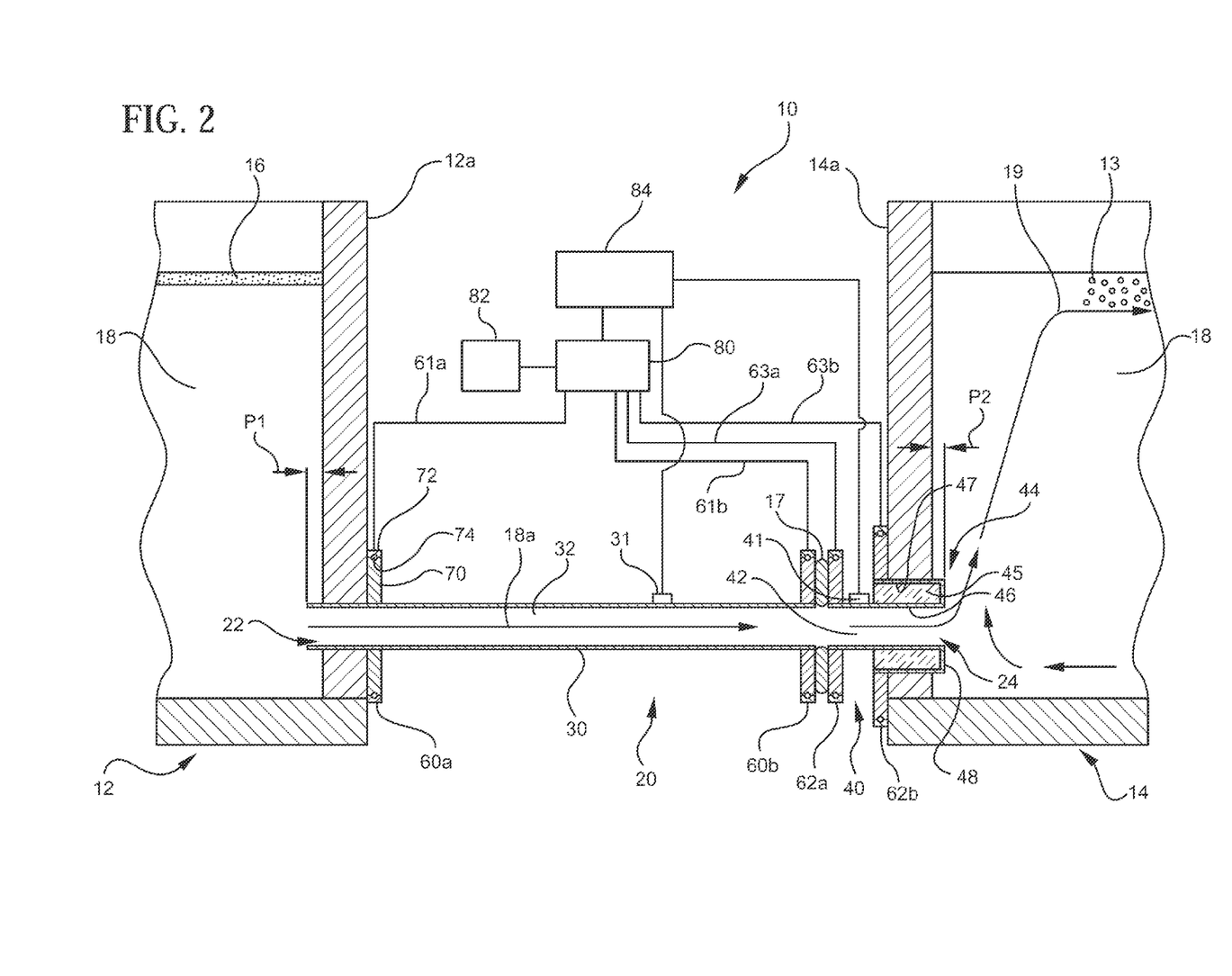
FIG. 2 is an enlarged view of the apparatus of FIG. 1 illustrating an example connecting tube connecting the first and second melting furnaces.

As further illustrated in FIGS. 1 and 2, the apparatus 10 can also include a connecting tube 20 connecting the first melting furnace 12 and the second melting furnace 14 for transporting a glass melt 18 from the first melting furnace 12 to the second melting furnace 14. The connecting tube 20 can comprise a cylindrical tube that may have a circular cross section along a plane taken substantially perpendicular to the longitudinal axis of the connecting tube. In further examples, the connecting tube may have an oval, curvilinear, polygonal or other cross sectional shape.

The connecting tube 20 can comprise various materials that are compatible with the temperature and chemistry of the glass. For instance, the connecting tube 20 can be designed to maintain its structural integrity at temperatures as high as about 1650 degrees Celsius while minimizing contamination of the glass melt. The connecting tube 20 may also be designed for relatively easy heating in order to increase or maintain the temperature of the molten glass flowing through the connecting tube 20. For example, the connecting tube 20 can include a refractory metal selected from the platinum group, or alloys thereof. The platinum group metals—ruthenium, rhodium, palladium, osmium, iridium, and platinum—are characterized by resistance to chemical attack, excellent high-temperature characteristics, and stable electrical properties. Other example refractory metals can include alloys of molybdenum and tungsten.

The connecting tube 20 can include a wide variety of configurations. For instance, as shown in FIG. 2, the connecting tube 20 can include a first portion 30 defining a first area 32 and a second portion 40 defining a second area 42. As shown, the first area 32 can be located upstream from the second melting furnace 14 and the second area 42 can be located downstream from the first area 32. The first portion 30 and the second portion 40 can be integral or separate from one another. Moreover, as shown, the first portion 30 can be electrically insulated from the second portion 40 although the first and second portion may be in electrical communication in further examples. The first portion 30 can be electrically insulated from the second portion 40 in a wide variety of ways. As shown, the first portion 30 can be separate and spaced from the second portion 40 to provide electrical insulation. Portions of the glass melt can seep into the area between the first portion 30 and the second portion 40 and freeze into place as a glass plug 17 between respective electrical contacts. The frozen glass plug 17 can act to fill the void between the first and second portion to contain the glass melt within the connecting tube while maintaining electrical insulation between the first portion 30 and the second portion 40.

As shown in FIG. 2, glass melt from the first melting furnace 12 can be designed to exit through an opening in the front wall 12a of first melting furnace 12 submerged below the surface of glass melt 18 in first melting furnace 12. Likewise, glass melt from the first melting furnace 12 can enter through a similar opening in the back wall 14a of the second melting furnace 14 submerged below the surface of the glass melt 18 in the second melting furnace 14. As illustrated in FIG. 2, the connecting tube 20 can include a first end 22 and a second end 24 opposite the first end 22. A portion of the connecting tube 20 proximate each end 22, 24 can be disposed adjacent or within the refractory wall of the respective melting furnaces, e.g., a portion of connecting tube 20 can be disposed adjacent or within the front wall 12a of the first melting furnace 12, and a portion of connecting tube 20 can be disposed adjacent or within the back wall 14a of the second melting furnace 14. Each end 22, 24 is can be disposed near the mid-point across the width of the respective furnace wall, and further disposed proximate the bottom of the respective furnace.

In one example, the first end 22 can be positioned at least partially within the front wall 12a of the first melting furnace 12. For example, as shown in FIG. 2, the first end 22 can extend through the front wall 12a with the first end 22 protruding a distance "P1" from an interior surface of the front wall 12a into an interior area of the first melting furnace 12. The protrusion distance "P1" can reduce glass melt flow along the interior surface of the front wall 12a as the glass melt is being drawn to the first end 22 of the connecting tube 20. Reducing glass melt flow along the interior surface of the front wall 12a can help avoid accelerated corrosion of the front wall 12a and increased refractory stones or cord in the glass melt. Likewise, the second end 24 can be positioned at least partially within the back wall 14a of the second melting furnace 14. For example, as shown in FIG. 2, the second end 24 can extend through the back wall 14a with the second end 24 protruding a distance "P2" from an interior surface of the back wall 14a into an interior area of the second melting furnace 14. The protrusion distance "P2" can reduce glass melt flow along the interior surface of the back wall 14a as the glass melt exits the second end 24 and begins to rise to the surface of the glass melt within the second melting furnace 14. Reducing glass melt flow along the interior surface of the back wall 14a can help avoid accelerated corrosion of the back wall 14a and increased refractory stones or cord in the glass melt. The protrusion distance "P1" and "P2" can each be from about 0.5 inches to about 1 inch although other protrusion distances are possible in further examples.

Although glass melt 18 can be heated within the furnaces, the refractory walls of the furnace themselves may not be directly heated. In fact, the walls of the furnace may act as a heat sink to the glass melt as it passes through the front wall 12a of the first melting furnace 12 and the back wall 14a of the second melting furnace 14. Still further, convection and radiation can account for significant heat loss as the glass melt passes through the connecting tube 20 from the front wall 12a of the first melting furnace 12 and the back wall 14a of the second melting furnace 14. Molten glass passing through the wall openings and an unheated connecting tube between furnaces could lose as much as 100 degrees Celsius in temperature, perhaps more. Potential drawbacks can result if the temperature of the melt entering the second melting furnace 14 is significantly cooler than the temperature of the melt within the second furnace. For example, if glass melt entering the second melting furnace 14 is significantly cooler (e.g., 100 degrees Celsius), the cooler glass entering the second melting furnace 14 may have a tendency to sink to the bottom of the second melting furnace 14 and flow directly to the furnace exit. This short-circuiting across the bottom of the second melting furnace 14 may reduce the residence time of the glass melt within the second melting furnace 14. Therefore, undesirable stones and knots may leave the second melting furnace 14 without complete dissolution within the glass melt that might otherwise occur with a longer residence time.

Aspects of the present invention can include two or more heating devices to compensate for heat loss as the glass melt passes from the first melting furnace 12 to the second melting furnace 14. Furthermore, the two or more heating devices can help prevent overheating of the connecting tube 20 while still providing beneficial temperature control of the glass melt. As shown in FIG. 2, in one example, the apparatus 10 can include a first heating device configured to heat the glass melt within the first area 32 of the connecting tube 20 and a second heating device configured to heat the glass melt within the second area 42 of the connecting tube 20. Providing separate heating devices can help prevent overheating of portions of the connecting tube that might occur with a single heating mechanism in certain apparatus configurations. For instance, in an effort to raise the temperature of the glass melt entering the second melting furnace 14, a single heating device may require overheating of an intermediate portion of the connecting tube 20. By providing at least two heating devices, heat may be incrementally added to the glass melt in series as the glass melt travels from the first melting furnace 12 to the second melting furnace 14.

The first heating device and the second heating device may heat the glass melt in various ways. For example, the connecting tube may be heated by induction, by radiating heaters, conduction heaters, convection heaters, or other heating configurations or combinations of heating configurations. As illustrated, the first heating device and the second heating device both comprise resistance heating configurations although one or both heating devices may comprise other heating configurations. The resistance heating configurations can be designed to heat portions of the connecting tube 20 by flowing an electric current, such as an alternating current, through portions of the connecting tube 20. Indeed, as shown, the first heating device can include a first electrical contact 60a and a second electrical contact 60b that are each placed in electrical communication with the first portion 30 of the connecting tube 20. The various electrical contacts described throughout the application can comprise various structures. As described with the first electrical contact 60a in FIG. 2, each electrical contact can comprise a platinum disk 70 attached to the connecting tube. A nickel ring 72 can be welded to the platinum disk 70 wherein an annular fluid path 74 is defined between the nickel ring 72 and the platinum disk 70. Cooling fluid can be circulated through the annular fluid path 74 to cool the contact and permit electrical lines to be provided in electrical communication with the connecting tube.

The first portion 30 defines an electrical path between the first electrical contact 60a and the second electrical contact 60b. The first electrical contact 60a can include a first electrical line 61a in communication with an electrical relay 80. Likewise, the second electrical contact 60b can include a second electrical line 61b in communication with the electrical relay 80. The electrical relay 80 can selectively close or open a first circuit including a power source 82. When the first circuit is closed, the power source 82 can cause electricity to flow through and thereby heat the first portion 30 of the connecting tube 20 extending between the electrical contacts 60a, 60b. Thus, when the first circuit is closed, the first heating device can heat the glass melt within the first area 32 of the connecting tube 20. Alternatively, the electrical relay 80 can open the first circuit to prevent heating of the first portion 30 of the connecting tube 20.

Similar to the first heating device, the second heating device can include a third electrical contact 62a and a fourth electrical contact 62b that are each placed in electrical communication with the second portion 40 of the connecting tube 20. The second portion 40 defines an electrical path between the third electrical contact 62a and the fourth electrical contact 62b. The third electrical contact 62a can include a third electrical line 63a in communication with the electrical relay 80. Likewise, the fourth electrical contact 62h can include a fourth electrical line 63b in communication with the electrical relay 80. The electrical relay 80 can selectively close or open a second circuit including the power source 82. When the second circuit is closed, the power source 82 can cause electricity to flow through and thereby heat the second portion 40 of the connecting tube 20 extending between the electrical contacts 62a, 62b. Thus, when the second circuit is closed, the second heating device can heat the glass melt within the second area 42 of the connecting tube 20. Alternatively, the electrical relay 80 can open the second circuit to prevent heating of the second portion 40 of the connecting tube 20.

In one example, a controller can be provided to automatically adjust the heat applied by at least one of the heating devices. For example, the controller can comprise a computer 84 configured to send a signal to the electrical relay 80 to open or close the first circuit to control heating by the first heating device. In addition, or alternatively, the computer 84 can be configured to send a signal to the electrical relay 80 to open or close the second circuit to control heating by the second heating device. In one example, the controller can automatically adjust the heat applied by at least one of the heating devices based on a measured temperature. For example, the first heating device can be provided with a first temperature gauge 31 and/or the second heating device can be provided with a second temperature gauge 41. In one example, the computer 84 can automatically open or close the first circuit based on temperature feedback from the first temperature gauge 31. Likewise, the computer 84 can automatically open or close the second circuit based on temperature feedback from the second temperature gauge 41. Accordingly, the controller can automatically activate or deactivate the first and/or second heating device based on measured temperature. As described above, the electrical relay 80 may function by opening or closing the first and second circuit. In further examples, the controller may function by modifying the voltage applied across the electrical contacts. Thus, the controller can continuously modify the heat applied by the heater based on the corresponding measured temperature.

As shown in FIG. 2, the first end 22 of the connecting tube 20 can include a substantially nonfolded end structure located within an opening of the front wall 12a of the first melting furnace 12 although the first end 22 may be located adjacent and outside the opening in further examples. The second end 24 of the connecting tube 20 can have a similar structure described with respect to the first end 22. For instance, the second end 24 can comprise a straight tube portion inserted within the back wall 14a of the second melting furnace 14. However, simply inserting a connecting tube 20 that is directly heated by electric current passing through it into the first or second melting furnace as a straight tube may not provide satisfactory heating of the passage. Indeed, the current will flow through the straight tube between the two connections located outside of the furnace. However, only the portions of the tube between the contacts will be heated. Thus, no current will flow through the portion of pipe within the wall of the furnace and heating of that portion the tube will not occur. In accordance with aspects of the present invention, portions of the tube within the front wall 12a and/or the back wall 14a may be heated. For instance, as described below, the first end 22 of the connecting tube 20 may be provided with an upstream folded end structure and/or the second end 24 of the connecting tube 20 can be provided with a downstream folded end structure.

FIG. 2 illustrates the second end 24 of the connecting tube 20 including an optional downstream folded end structure 44. In one example, the downstream folded end structure 44 can be positioned at least partially within a back wall 14a of the second melting furnace 14. For example, the downstream folded end structure can extend through the back wall 14a with an end of the downstream folded end structure 44 protruding a distance "P2" from an interior surface of the back wall 14a into an interior area of the second melting furnace 14. Providing a folded end structure can permit location of the electrical contacts outside of the second melting furnace 14 while still permitting heating of portions of the folded end structure located within the back wall 14a of the second melting furnace 14. Indeed, as shown, the third electrical contact 62a can be located at an end of a first part 46 of the folded end structure 44 while the fourth electrical contact 62b can be located at an end of a second part 47 of the folded end structure 44. The first part 46 and the second part 47 can be joined by an end part 48. Electrical current can pass from the third electrical contact 62a through the first part 46 and into the back wall 14a of the second melting furnace 14. The electrical current can then pass through the end part 4S and then change directions by passing through second part 47 back out of the back wall 14a. Thus, it will be appreciated that the second area 42 of the connecting tube 20 can be heated at least partially within the back wall 14a while the third and fourth electrical contacts 62a, 62b are located outside of the back wall 14a.

As further illustrated, the downstream folded end structure 44 can define a gap. The gap can provide an insulation barrier between the first part 46 of the folded end structure 44 and the back wall 14a. Indeed, as shown, the first part 46 can be spaced from the second part 47 to define the gap therebetween. As shown, refractory material 45 can be positioned at least partially within the gap. The refractory material 45 can provide further insulation and can also act as a spacer to provide relative support between the first part 46 and second part 47. As shown, example downstream folded end structures can include an end portion of a tube that is turned inside out and folded back on itself such that the first part 46 is concentric with respect to the second part 47.

Figure 3:
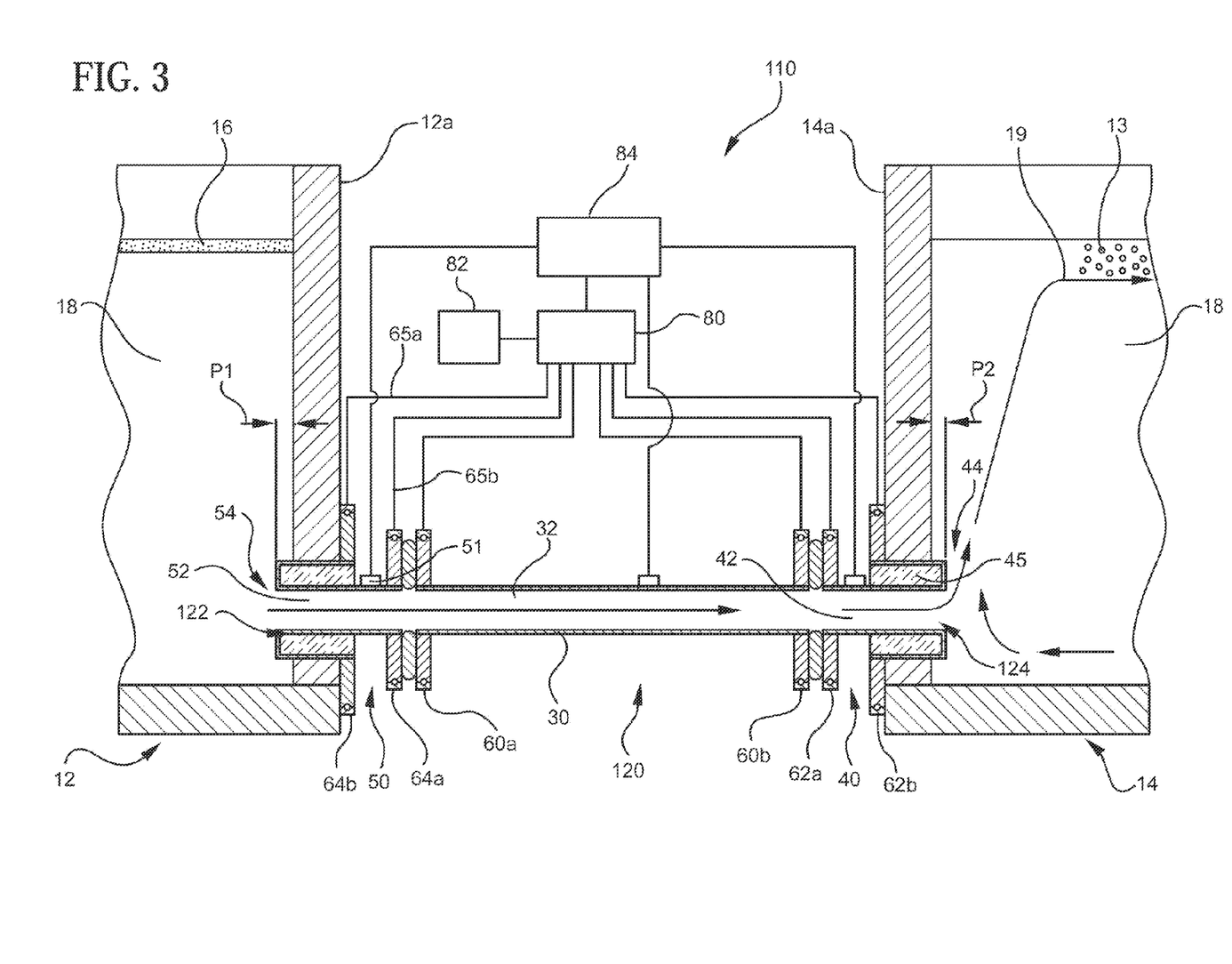
FIG. 3 is an enlarged view of another example embodiment of an apparatus including another example connecting tube connecting the first and second melting furnaces.

The temperature of the molten glass entering the second melting furnace 14 can be of greater interest than the temperature of the glass melt leaving the first melting furnace 12. Accordingly, as shown in FIG. 2, a configuration can be provided with only the second end 24 including the folded end structure. Alternatively, as shown in FIG. 3, a first end 122 and a second end 124 of a connecting tube 120 both include a folded end structure. Indeed, the first end 122 includes an upstream folded end structure 54 positioned at least partially within the front wall 12a while the second end 124 includes a downstream folded end structure 44 positioned at least partially within the back wall 14a. For example, the upstream folded end structure 54 can extend through the front wall 12a with an end of the upstream folded end structure 54 protruding a distance "P1" from an interior surface of the front wall 12a into an interior area of the first melting furnace 12. In addition or alternatively, the downstream folded end structure 44 can extend through the back wall 14a with an end of the downstream folded end structure protruding a distance "P2" from an interior surface of the back wall 14a into an interior area of the second melting furnace 14. As mentioned previously, the protrusion distance "P1" and "P2" can reduce glass melt flow along the interior surface of the front wall 12a and back wall 14a, respectively. Reducing glass melt flow along the interior surfaces can help avoid accelerated corrosion of the respective walls and increased refractory stones or cord in the glass melt. The protrusion distance "P1" and "P2" can each be from about 0.5 inches to about 1 inch although other protrusion distances are possible in further examples.

The upstream folded end structure 54 can be part of the first portion 30 of the connecting tube 120. Alternatively, as shown, the connecting tube 120 can include a third portion 50 defining a third area 52 wherein the third portion 50 includes the upstream folded end structure 54. The third portion 50 and the first portion 30 can be integral or separate from one another. Moreover, as shown, the third portion 50 can be electrically insulated from the first portion 30 although the first and second portion may be in electrical communication in further examples. The third portion 50 can be electrically insulated from the first portion 30 in a wide variety of ways. As shown, the third portion 50 can be separate and spaced from the first portion 30 to provide electrical insulation. Portions of the glass melt can seep into the area between the third portion 50 and the first portion 30 and freeze into place between respective electrical contacts to contain the glass melt within the connecting tube while maintaining electrical insulation between the third portion 50 and the first portion 30.

The upstream folded end structure 54, if provided, can be a substantial mirror image of the downstream folded end structure 44 and can operate in a similar manner. Thus, as shown in FIG. 3, the apparatus 110 can include a third heating device configured to heat the glass melt within the third area 52 of the connecting tube 120 located upstream from the first area 32 of the connecting tube 120. The third heating device can include a fifth electrical contact 64a and a sixth electrical contact 64b that are each placed in electrical communication with the third portion 50 of the connecting tube 120. The third portion 50 defines an electrical path between the fifth electrical contact 64a and the sixth electrical contact 64b. The fifth electrical contact 64a can include a fifth electrical line 65a in communication with the electrical relay 80. Likewise, the sixth electrical contact 64b can include a sixth electrical line 65b in communication with the electrical relay 80. The electrical relay 80 can selectively close or open a third circuit including a power source 82. When the third circuit is closed, the power source 82 can cause electricity to flow through and thereby heat the third portion 50 of the connecting tube 120 extending between the electrical contacts 64a, 64b. Thus, when the third circuit is closed, the third heating device can heat the glass melt within the third area 52 of the connecting tube 20. Alternatively, the electrical relay 80 can open the first circuit to prevent heating of the third portion 50 of the connecting tube 120.

In one example, the controller can be provided to automatically adjust the heat applied by the first, second and third heating device. For example, the controller can automatically adjust the first and second heating device as described with respect to the apparatus 10 illustrated in FIG. 2. Likewise, the controller can automatically adjust the heat applied by the third heating device shown in FIG. 3. For example, the computer 84 can send a signal to the electrical relay 80 to open or close the third circuit to control heating by the third heating device. In one example, third heating device can be provided with a third temperature gauge 51 and the computer 84 can automatically open or close the third circuit based on temperature feedback from the third temperature gauge 51. The electrical relay 80 may therefore function by opening or closing the third circuit. In further examples, the controller may function by modifying the voltage applied across the electrical contacts. Thus, the controller can continuously modify the heat applied by the heater based on the corresponding measured temperature.

Example methods of making glass in accordance with aspects of the present invention will now be described. Methods of making glass can include the step of providing a glass melt 18 in a first melting furnace 12. As shown in FIG. 1, glass feed materials are fed into first melting furnace 12, as indicated by arrow 15. The feed materials may be introduced into the first melting furnace 12 either by a batch process, wherein the glass forming constituents are mixed together and introduced into the first melting furnace 12 as a discrete load, or the feed materials may be continuously mixed and introduced into the first glass melter. As indicated by arrow 15, the feed materials may be introduced through an opening or port in the furnace structure, either through the use of a push bar or scoop, in the case of a batch process, or in the case of a continuous feed melter, a screw or auger apparatus may be used. The amount and type of feed material constituents comprises the glass "recipe". Batch processes can be used for small amounts of glass and used in furnaces having a capacity on the order of up to a few tons of glass, whereas a large commercial, continuous feed furnace may hold in excess of 1,500 tons of glass, and deliver several hundred tons of glass per day.

The feed materials may be heated in the first melting furnace 12 by a fuel-air (or fuel-oxygen) flame issuing from one or more burners above the feed material, by an electric current passed between electrodes typically mounted in the interior melter walls, or both. A crown structure above the walls, also made from refractory block, can cover the melting furnaces and, in a combustion-heated furnace, provides a space for combustion of the fuel.

In some processes, the feed materials may be first heated by a fuel-air flame, whereupon the feed materials begin to melt and the resistivity of the feed materials decreases. An electric current can be thereafter passed through the feed materials/ melt mixture to complete the heating and melting process. During heating, reaction of the feed materials releases a variety of gases which form inclusions, commonly referred to as blisters or seeds, within the glass melt. Seeds may also form as a result of air trapped within the interstitial spaces between the particles of feed material, and from dissolution of the refractory blocks themselves into the melt. The gases which may constitute seeds may comprise, for example, any one or a mixture of $O_2$, $CO_2$, $CO$, $SO_2$, $Ar$, $N_2$ and $NO$. If not removed, seeds may be passed through the glass making process and, undesirably, into the eventual glass product. The removal of gaseous inclusions is referred to as fining. Solid inclusions may also make their way into the final product if incomplete melting and dissolution occurs, for example if the melt experiences an insufficient residence time at appropriate temperatures during melting. Solid inclusions which may comprise the melt are unmelted feed materials (stones) and small regions of the glass melt (knots) that have not fully melted and are not homogeneous with the rest of the melt, possessing a refractive index different from the bulk melt.

During melting, a foam layer 16 may form on the surface of the melt. This is particularly true for alkali-free aluminosilicate glasses. Without wishing to be held to theory, it is believed the foamy mass is due to a degree of alumina and silica stratification, wherein the more viscous but less dense silica-rich glass floats above less viscous but heavier alumina-rich glass. Seeds which rise upward through the melt become trapped in the viscous silica-rich glass, forming a foam layer overtop the melt. This foamy mass may also include raw feed materials, and byproducts of the melting process.

Referring to FIG. 2, methods of the present invention can further include the step of flowing the glass melt 18 through a connecting tube 20 from the first melting furnace 12 to the second melting furnace 14. As shown, the glass melt flows along a first path 18a through the first area 32 of the connecting tube 20 located upstream from the second melting furnace 14. The glass melt then continues to flow along first path 18a through the second area 42 of the connecting tube 20 located downstream from the first area 32. The method can further include the step of heating the glass melt within the first area 32 with a first heating device. In one example, the first heating device can function to maintain the glass melt at substantially the same temperature that the glass melt is maintained in the first melting furnace 12. For instance, the first heating device can be configured to maintain the glass melt in the first area 32 within a temperature range of from about 1570 degrees Celsius to about 1620 degrees Celsius, such as from about 1600 degrees Celcius to about 1620 degrees Celsius.

The method can further include the step of heating the glass melt within the second area 42 with a second heating device. In one example, the second heating device can also function to maintain the glass melt at substantially the same temperature that the glass melt is maintained in the first melting furnace. For example, the second heating device can be configured to maintain the glass melt in the second area 42 within a temperature range of about 1570 degrees Celsius to about 1620 degrees Celsius, such as from about 1600 degrees Celcius to about 1620 degrees Celsius. The second heating device can be designed to permit introduction of glass melt into the second melting furnace 14 at a temperature about 20 degrees Celsius greater than the average temperature of the glass melt in the second melting furnace 14. The relatively high temperature of the glass melt entering the second melting furnace 14 can cause a rotational pattern 19. Indeed, the glass melt entering the second melting furnace 14 tends to rise to the surface of the glass melt wherein fining more easily occurs as glass bubbles 13 are released at the surface of the glass melt 18. As the glass melt cools, it flows down and a portion of the glass melt is drawn back towards the back wall 14*a* as it travels through the rotational pattern 19 for recycling again through the second melting furnace 14. Thus, the relatively hot glass melt entering the second melting furnace 14 helps circulate the glass melt 18 to increase the residual time within the second melting furnace 14 while also helping the fining process as the glass melt flows by the surface of the glass melt.

Advantageously, the atmosphere about connecting tube 20 between first and second melting furnaces 12, 14 can be regulated so as to provide a predetermined partial pressure of hydrogen within the atmosphere. As disclosed, for example, as disclosed in U.S. Patent Application Publication No. 2006/0242996, filed on Apr. 27, 2005, the partial pressure of hydrogen outside and in contact with connecting tube 20 may be used to control the removal of gaseous inclusions in molten glass within a refractory metal vessel. Such control is facilitated by enclosing the vessel in an enclosure surrounding the vessel, the enclosure surrounding the vessel enclosing also an atmosphere in contact with the refractory metal vessel. Cooling of the glass as it exits through front wall 12*a* of first melting furnace 12 can be used to reload the multivalent fining agent or agents within the glass with oxygen. By subsequently lowering the hydrogen partial pressure of the atmosphere in contact with connecting tube 20 outside the walls of the melting furnaces, hydrogen permeation from the glass melt through and out of connecting tube 20 can be encouraged, causing a release of oxygen and vigorous bubbling within the molten glass transiting the connecting tube. This large oxygen release can aid in the coalescence of seeds within the melt. Reloading of the fining agent can be used to improve initial fining within second melting furnace 14 and during later fining steps, such as within fining vessel 11 downstream of and in fluid communication with second melting furnace 14. The partial pressure of hydrogen of the atmosphere contacting the connecting tube 20 may be controlled, for example, by controlling the effective dew point of the atmosphere in contact with connecting tube 20.

In accordance with the present invention, unlike the surface of the melt in first melting furnace 12, surface of the glass melt within second melting furnace 14 is substantially free of foam, particulate and other contaminating features as described herein. The foam-free surface of the melt in second melting furnace 14 can provide for greater thermal efficiency of combustion burners (not shown) located above the surface of the melt. The foam layer 16 present in first melting furnace 12 acts to insulate the surface of the glass melt from heat generated by combustion burners. Consequently, approximately 75% of the heat generated for melting in first melting furnace 12 occurs due to Joule heating by electric current, with an approximately 25% contribution from fuel-oxygen burners above glass melt 18. Electric melting is energy efficient, but the local temperatures on the sidewalls near the electrodes can be very high and refractory life is usually shorter for electric melting than for primarily combustion melting. On the other hand, the substantially foam-free surface of glass melt 18 in second melting furnace 14 may allow for a significant amount of heat to be contributed to the melt by fuel-oxygen burners rather than electric Joule heating.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of making glass comprising the steps of:
providing a glass melt in a first melting furnace;
flowing the glass melt through a connecting tube from the first melting furnace to a second melting furnace by initially flowing the glass melt through a first area defined by an interior surface of a first segment of the connecting tube located upstream from the second melting furnace with the glass melt contacting the interior surface of the first segment as the glass melt flows through the first area, and then subsequently flowing the glass melt through a second area defined by an interior surface of a second segment of the connecting tube located downstream from the first area with the glass melt contacting the interior surface of the second segment as the glass melt flows through the second area;
providing an electrical discontinuity between the first segment and the second segment of the connecting tube;
heating the glass melt within the first area by passing a first predetermined level of electrical current through the first segment of the connecting tube to directly heat the first segment with electrical resistance resulting from the first predetermined level of electrical current passing through the first segment, wherein heat is transferred from the first segment to the glass melt contacting the interior surface of the first segment;
heating the glass melt within the second area by passing a second predetermined level of electrical current through the second segment of the connecting tube to directly heat the second segment with electrical resistance heating resulting from the electrical current passing through the second segment, wherein heat is transferred from the second segment to the glass melt contacting the interior surface of the second segment; and
maintaining the temperature of the glass melt within a desired temperature range as the glass melt passes through the first area and the second area of the connecting tube by selecting the predetermined levels of current to provide corresponding levels of electrical resistance heating with the first and second segments of the connecting tube.

2. The method of claim 1, wherein the second segment of the connecting tube includes a downstream folded end structure at least partially positioned within a back wall of the second melting furnace, and the second predetermined level of electrical current flows through the downstream folded end structure to directly heat the downstream folded end structure with electrical resistance heating resulting from the second predetermined level of electrical current passing through the downstream folded end structure.

3. The method of claim 1, further comprising the step of automatically adjusting the level of electrical current passing through at least one of the first segment and the second segment based on a measured temperature.

4. The method of claim 1, further comprising the steps of flowing the glass melt through a third area defined by a third segment of the connecting tube located upstream from the first area of the connecting tube, and heating the glass melt within the third area of the connecting tube by passing a third predetermined level of electrical current through the third segment of the connecting tube to directly heat the third segment with electrical resistance heating resulting from the third predetermined level of electrical current passing through the third segment.

5. The method of claim 4, wherein the third segment of the connecting tube includes an upstream folded end structure at least partially positioned within a front wall of the first melting furnace, and the third predetermined level of electrical current flows through the upstream folded end structure to directly heat the upstream folded end structure with electrical resistance heating resulting from the third predetermined level of electrical current passing through the upstream folded end structure.

6. The method of claim 1, wherein the desired temperature range is about 1570 degrees Celsius to about 1620 degrees Celsius.

7. The method of claim 1, further comprising the step of adjusting the level of electrical current passing through the first segment with respect to the level of electrical current passing through the second segment to maintain the temperature of the glass melt within the desired temperature range.

8. The method of claim 1, further comprising the step of providing a first heating device and a second heating device, wherein the step of heating the glass melt within the first area includes the step of passing the first predetermined level of electrical current through the first segment with the first heating device, and the step of heating the glass melt within the second area includes the step of passing the second predetermined level of electrical current through the second segment with the second heating device.

9. The method of claim 8, wherein the first heating device is operated independently of the second heating device.

10. The method of claim 1, wherein the step of heating the glass melt within the first area includes passing the first predetermined level of electrical current through the first segment between an upstream electrical contact in electrical communication with an upstream portion of the first segment and a downstream electrical contact in electrical communication with a downstream portion of the first segment of the connecting tube.

11. The method of claim 10, wherein the step of heating the glass melt within the second area includes passing the second predetermined level of electrical current through the second segment between another upstream electrical contact in electrical communication with an upstream portion of the second segment and another downstream electrical contact in electrical communication with a downstream portion of the second segment of the connecting tube.

12. The method of claim 1, wherein the step of heating the glass melt within the second area includes passing the second predetermined level of electrical current through the second segment between an upstream electrical contact in electrical communication with an upstream portion of the second segment and a downstream electrical contact in electrical communication with a downstream portion of the second segment of the connecting tube.

13. The method of claim 1, further comprising the step of spacing a downstream end of the first segment from an upstream end of the second segment to provide the electrical discontinuity between the first segment and the second segment of the connecting tube.

14. The method of claim 13, further comprising the step of forming a plug within the space between the downstream end of the first segment and the upstream end of the second segment.

15. The method of claim 13, further comprising the step of forming a glass plug with a portion of the glass melt within the space between the downstream end of the first segment and the upstream end of the second segment.

* * * * *